United States Patent Office 2,739,160
Patented Mar. 20, 1956

2,739,160

BIS-GLYCIDYL ETHERS OF HINDERED DIHYDROXYBENZENES AND PROCESS FOR THEIR MANUFACTURE

Alan Bell and Wayne V. McConnell, Kingsport, Tenn., assignors to Eastman Kodak Company, Rochester, N. Y., a corporation of New Jersey No Drawing. Application October 1, 1952, Serial No. 312,637

8 Claims. (Cl. 260—348)

This invention relates to bis-glycidyl ethers of hindered dihydroxybenzenes and to a process for manufacturing these ethers. The bis-glycidyl ethers of hindered dihydroxybenzenes, that is, of dihydroxy benzenes in which at least one of the hydroxyl groups is sterically hindered by a substituent group, cannot be obtained by the known methods of preparing the bis-glycidyl ethers of dihydroxybenzenes which are not hindered. For example, when tertiary-butyl hydroquinone or 2-(1,1,3,3-tetramethylbutyl) hydroquinone (octyl hydroquinone) is reacted with epichlorohydrin in aqueous alcohol containing the theoretical amount of sodium hydroxide for forming the disodium salt, the mono-glycidyl ether is formed. When this method is applied to 2,5-di-tertiary-butyl hydroquinone, very little if any glycidyl ether is obtained, and the hydroquinone is almost quantitatively recovered.

We have discovered that the bis-glycidyl ethers of hindered dihydroxybenzenes can be readily prepared by heating a di-alkali-metal salt of the substituted dihydroxybenzene with excess epichlorohydrin. By way of illustrating our invention, we give the following examples.

Example 1.—Preparation of 2-tert.-butylhydroquinone bis-glycidyl ether,

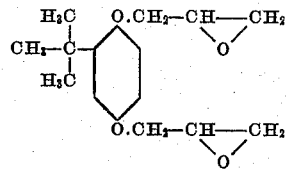

23 g. (1 g.-atom) of sodium was added in portions to 400 ml. of dry methanol contained in a 3-liter, 3-necked flask equipped with a distillation head, mechanical stirrer, thermometer and gas inlet tube. After the sodium had completely reacted, a solution of 83 g. (0.5 mole) of 2-tert.-butyl hydroquinone in 200 ml. of methanol was admitted to the reaction vessel, after which practically all of the methanol was removed by distillation under a nitrogen atmosphere, with mechanical stirring. Anhydrous benzene was added and distilled, with mechanical stirring, until the head temperature rose above 70° C., and the residue was brought to near-dryness by evacuating the flask and heating up to 50° C. 463 g. (5.0 moles) of epichlorohydrin was added to the salt and the mixture stirred and heated at 55°–70° C. for 15 hours under nitrogen. The excess epichlorohydrin and any dichlorohydrin formed were then distilled off at 1–5 mm. pressure, using a maximum pot temperature of 70° C. The residue was suspended in ether and the mixture washed with three half-volumes of water to remove sodium chloride. The ether solution was dried with magnesium sulfate and the ether removed by distillation. 139 g. (100% yield) of a viscous oil having an oxirane oxygen content of 9.8% was obtained as residue. 45.5 g. of the residue was distilled, yielding 37.2 g. (82%) of a straw-colored oil boiling at 150–170° C. at 0.1 mm. pressure, and having an oxirane oxygen value of 10.2%; 8.3 g. (18%) of polymeric material remained in the flask. The oxirane oxygen content calculated for 2-tert.-butyl hydroquinone bis-glycidyl ether is 11.5%.

Example 2.—Preparation of 2-(1,1,3,3-tetramethyl butyl) hydroquinone bis-glycidyl ether,

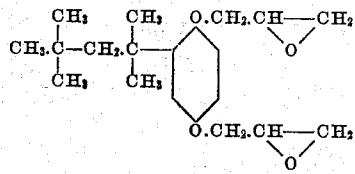

This compound was prepared from 0.25 mole of the disodium salt of 2-(1,1,3,3-tetramethylbutyl) hydroquinone and 2.5 moles of epichlorohydrin, using the procedure described in Example 1. 75 g. (90% yield) of a viscous oil having an oxirane oxygen content of 9.8% (theory= 9.6%) was obtained from the reaction mixture. 82% of the product distilled at 150–175° C. at 0.1 mm. pressure, and had an oxirane oxygen value of 8.3%. The remaining 18% was a polymeric residue.

Example 3.—Preparation of phenylhydroquinone bis-glycidyl ether,

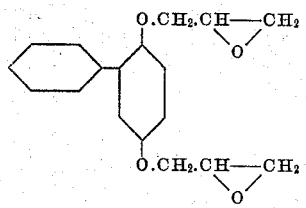

Following the method described in Example 1, 0.25 mole of the disodium salt of phenylhydroquinone was prepared and reacted with 2.5 moles of epichlorohydrin to yield 70 g. (94% yield) of an oil with an oxirane oxygen content of 8.8% (theory=10.7%).

Example 4.—Preparation of 2,5-di-tert.-butyl hydroquinone bis-glycidyl ether,

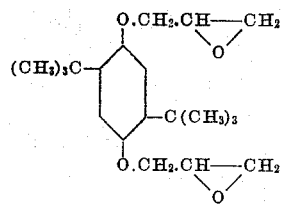

This compound was obtained by preparing the disodium salt of 111 g. (0.5 mole) of 2,5-di-tert.-butyl hydroquinone and heating the salt with 462.5 g. (5.0 moles) of epichlorohydrin as described in Example 1. The reaction product was an 80% yield of a brown solid containing a small amount of gum. The crude product was washed with pentane, which removed most of the gum and some of the color. After the pentane wash, the crude product had an oxirane oxygen content of 8.6%, as compared to the calculated value of 9.6%. Recrystallization from isopropyl alcohol gave a light buff colored solid melting at 140–143° C. and having an oxirane oxygen content of 8.5%.

In preparing the alkali metal salt of the hindered dihydroxybenzene, potassium may be used in place of sodium. Also, other alcohols (such as ethyl alcohol) and alcoholates may be used in the preparation of the salts. The alkali salts can be prepared by other methods, such as reacting the hindered dihydroxybenzene with sodium in liquid ammonia, or by using alcoholic alkali hydroxide. In place of benzene, other solvents which would aid in the removal of alcohol from the dihydroxybenzene salt may be used. This removal of alcohol is not essential, although preferable, since the reaction may also be carried out using alcohol as a solvent.

Reaction temperatures lower or higher than those shown in the examples for the formation of the bis-glycidyl ether may be used, but the temperature must not be so high that decomposition or polymerization of the epoxy compound takes place in the reaction mixture. Diluents, such as aromatic or aliphatic hydrocarbons or other media which would not substantially enter into the reaction may be present during the reaction with epichlorohydrin. Small quantities of zinc or sodium hydrosulfite may be present; this helps to prevent formation of colored by-products due to oxidation in the alkaline medium. Bis-glycidyl ethers of hindered resorcinol and hindered catechol may also be prepared by this method, as well as glycidyl ethers of hindered monohydric phenols.

The bis-glycidyl ethers of hindered dihydroxybenzenes are useful as stabilizers for plastic compositions, including, among others, cellulose esters, polyvinyl chloride, and co- and homo-polymers of acrylonitrile and substituted acrylonitriles.

What we claim as our invention and desire to be secured by Letters Patent of the United States is:

1. A process of preparing a bis-glycidyl ether of a substituted dihydroxybenzene in which a substituent group exerts steric hindrance of at least one hydroxy group, which comprises reacting a di-alkali-metal salt of the substituted dihydroxybenzene with epichlorohydrin in the presence of excess epichlorohydrin, in the absence of water.

2. A bis-glycidyl ether of a substituted hydroquinone selected from the group consisting of tertiary butyl hydroquinone, (1,1,3,3-tetramethylbutyl) hydroquinone, phenyl hydroquinone, and di-tertiary-butyl hydroquinone.

3. A process of preparing a bis-glycidyl ether of a substituted hydroquinone in which a substituent group exerts steric hindrance of at least one hydroxy group, which comprises reacting a di-alkali-metal salt of the substituted hydroquinone with epichlorohydrin in the presence of excess epichlorohydrin, in the absence of water.

4. A process of preparing a bis-glycidyl ether of a substituted resorcinol in which a substituent group exerts steric hindrance of at least one hydroxy group, which comprises reacting a di-alkali-metal salt of the substituted resorcinol with epichlorohydrin in the presence of excess epichlorohydrin, in the absence of water.

5. The bis-glycidyl ether of tertiary butyl hydroquinone.

6. The bis-glycidyl ether of (1,1,3,3-tetramethylbutyl) hydroquinone.

7. The bis-glycidylether of phenyl hydroquinone.

8. The bis-glycidyl ether of di-tertiary-butyl hydroquinone.

References Cited in the file of this patent

UNITED STATES PATENTS

| | | |
|---|---|---|
| 2,221,818 | Slaugh et al. | Nov. 19, 1940 |
| 2,467,171 | Werner et al. | Apr. 12, 1949 |
| 2,548,447 | Shokal | Apr. 10, 1951 |
| 2,602,785 | Wiles | July 8, 1952 |